United States Patent [19]

Knowd

[11] 4,257,273
[45] Mar. 24, 1981

[54] SOUND PRESSURE LEVEL METER

[75] Inventor: Michael J. Knowd, Vadnais Heights, Minn.

[73] Assignee: Minnesota Mining and Manufacturing Company, St. Paul, Minn.

[21] Appl. No.: 60,926

[22] Filed: Jul. 26, 1979

[51] Int. Cl.³ ............................................. G01H 3/14
[52] U.S. Cl. ...................................................... 73/647
[58] Field of Search .................................. 73/645–647

[56] References Cited

U.S. PATENT DOCUMENTS

| | | | |
|---|---|---|---|
| 3,661,224 | 5/1972 | Allen et al. | 73/647 |
| 3,950,700 | 4/1976 | Weisbart | 340/670 |
| 3,968,697 | 1/1977 | Mutziger | 73/647 |

OTHER PUBLICATIONS

Gin Rod Corporation Brochure on Model GR 1981 Precision Sound Level Meter.

*Primary Examiner*—James J. Gill
*Attorney, Agent, or Firm*—Cruzan Alexander; Donald M. Sell; William B. Barte

[57] ABSTRACT

A sound pressure level meter adapted for use in monitoring noise levels, particularly for use by law enforcement agencies wherein the device includes means for providing a logarithmic indication of the root mean square value of ambient sound pressure levels and wherein means are provided for holding and displaying a maximum sound pressure level detected over a given period of time and for providing an alarm when a detected level exceeds a predetermined threshold level.

4 Claims, 3 Drawing Figures

SOUND PRESSURE LEVEL METER

BACKGROUND OF THE INVENTION

This invention relates to devices for detecting sound pressure levels such as may be useful for monitoring noise levels in varying environments, particularly with respect to mobile monitoring of automotive and truck noise levels by law enforcement agencies.

While vehicle mounted speed detectors based on radar principles are relatively well known and are commonly used by law enforcement officials, the need to monitor vehicular noise levels in an analogous way has, until recently, been mostly conjectural. Devices adapted to monitor sound pressure levels have heretofore been complex, difficult to operate and expensive, and have been designed for precision laboratory use, where precise tolerances, multiple scales, variable frequency responses, meter response times are desired. Such devices have been found to be unsuitable for law enforcement applications, not only due to their complexity and attendant expense, but also because they have failed to provide features of appreciable importance in that area of use.

SUMMARY OF THE INVENTION

In contrast to such prior art devices, the device of the present invention provides significantly improved capabilities, making it particularly desirable in routine sound pressure level monitoring. The device provides a digital display of sound pressure levels over an extended range of levels, i.e. preferably between 55 and 105 db.

In the devices of the present invention, means are also provided for responding to the logarithmic signal in order to generate and hold a maximum level signal which corresponds to the logarithm of a maximum sound pressure level detected over a given period of time. Such a means is also enabled to be reset at the initiation of another time period.

In order to enable activation of an alarm in the event of detection of an ambient sound pressure level in excess of a predetermined threshold sound pressure level, means are also included for providing a reference signal representative of such a threshold level and for comparing the reference signal with the maximum level signal so as to initiate an alarm when the maximum level signal exceeds the reference signal. Also, means are provided for switching between the three signals, i.e. the logarithmic signal, the maximum level signal, and the reference signal, to provide as an operative signal a selected one of the three, for converting the operative signal into a digital equivalent thereof, and for displaying the decimal equivalent. Accordingly, the display is adapted to selectively and reversibly display a representation of either the ambient sound pressure level, the maximum sound pressure level, or the predetermined threshold sound pressure level without the display of one of the levels affecting or preventing the subsequent display of the other. The display of the representation of the predetermined threshold level enables the ready awareness of just what the preselected threshold level is and facilitates convenient adjustment of the reference signal corresponding to a desired preselected level.

DESCRIPTION OF THE PREFERRED EMBODIMENT

Figure 1:
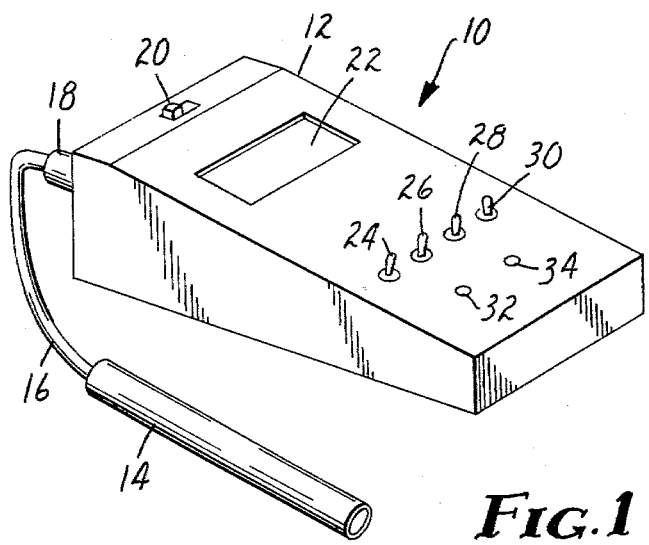
FIG. 1 is a perspective view of one embodiment of the device of the present invention.

A preferred configuration for the sound pressure monitoring device of the present invention is shown in FIG. 1. As there shown, the device 10 includes a housing 12 and an acoustical transducer 14 which is coupled to the housing 12 by means of a cable 16 and connector 18. The top panel of the housing 12 includes an on-off power switch 20, a digital display 22, control switches 24 through 30, and adjustment controls 32 and 34.

Figure 2:
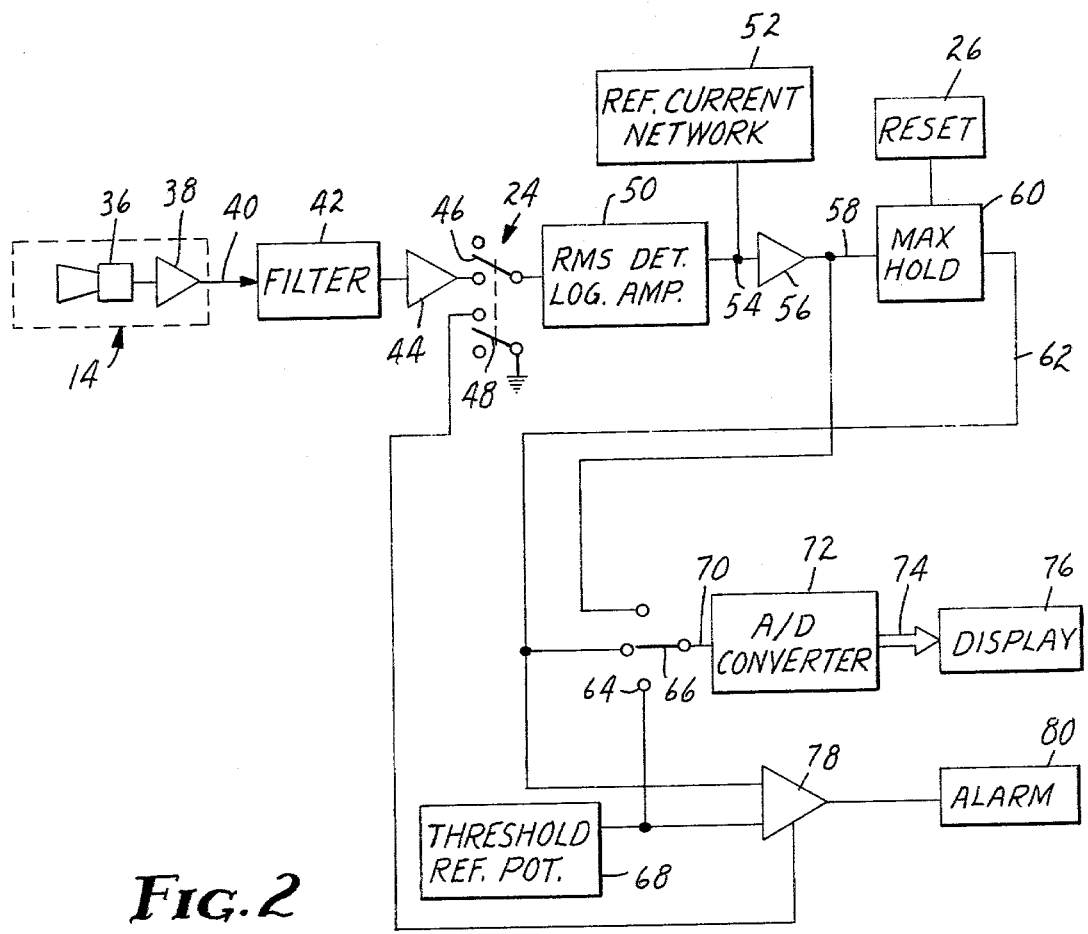
FIG. 2 is a block diagram of an electrical circuit utilized in a preferred embodiment.

The functions of these various components are best described in conjunction with the block diagram shown in FIG. 2. As is there shown, the transducer 14 preferably includes within the same enclosure a high impedance, wide dynamic range piezoelectric type microphone 36 and a preamplifier 38, which amplifies the signal provided by the transducer 36, and provides a low impedance output electrical signal for optimum coupling to the cable 40. The remaining components of the device 10 are included within the housing 12 of FIG. 1. The incoming electrical signal on lead 40 is first coupled to a filter circuit 42 which includes a weighting network for shaping the frequency response of the transducer 36 as evidenced in the electrical signal on lead 40 to a weighted curve approximating the response of a human ear. Perferably, such a response corresponds to the "A" weighting response curve in conformance with IEC 179 and American National Standards Institute (ANSI) S 1.4—1971 standards.

The output of the filter circuit 42 is coupled to an isolation amplifier 44 and thence to a lockout switch 24, which is the first of the switches shown in FIG. 1. Swtich 24 includes two poles, 46 and 48, respectively, the first of which is adapted to interrupt the signal received from the amplifier 44. The second pole 47 of the switch 24 is adapted to control an alarm circuit as described hereinafter. When switch 24 is positioned in the normal position, pole 46 is closed and the signal from the amplifier 44 is coupled to an rms detector/logarithmic amplifier 50. This amplifier converts the input electrical signal into a signal representative of the true rms value of the input and further converts the rms signal into a logarithmic signal, thus providing at node 54, a logarithmic representation of the rms value of the signal received averaged over a 125 millisecond period as recommended in a proposed ANSI standard. Such an amplifier is preferably a type AD 536K integrated circuit, such as manufactured by Analog Devices, Inc. of Boston, Mass. The circuit provides a bipolar output which is linear in decibels, providing an absolute voltage level of 3 millivolts per db which varies logarithmically above and below some reference level, such as ground.

In order to convert such a bipolar output above a reference level to provide a unipolar signal, a reference current from network 52 is summed with the output of the amplifier 50 at node 54. The converted unipolar signal is then further amplified within an integrated circuit amplifier 56. The overall sensitivity of the amplifiers 50 and 56 and the setting of the network 52 is desirably controlled to provide an output on lead 58 in which an absolute signal of one volt corresponds to an ambient sound pressure level of 100 db.

The signal on lead 58 is coupled to a maximum hold circuit 60, which circuit is adapted to be reset by a switch 26. The maximum hold circuit 60 stores the maximum level of the signal received on lead 58 until such time as the circuit is reset by switch 26, and thus provides a maximum level signal on lead 62, which corresponds to the logarithm of a maximum sound pressure level detected over a given period of time. The logarithmic signal on lead 58 and the maximum level signal on lead 62 are coupled, together with reference signal representative of a predetermined threshold sound pressure level on lead 64, to respective contacts of a three position switch 66. The reference level signal on lead 64 is provided from a threshold reference potential network 68. By controlling the position of the switch 66, an operative signal is provided on lead 70 which is one of the three signals, i.e., either the logarithmic signal, the maximum level signal, or the threshold level reference signal. The switch 66 may, as in the embodiment shown in FIG. 1, comprise two switches 28 and 30, the first of which is adapted to switch between the logarithm signal and the maximum level signal to provide a sound level signal, and the second switch 30 to switch between such a signal and the threshold reference level signal so as to provide the operative signal as described above. Such a signal is coupled to an A/D converter 72, which is of a conventional nature for converting the analog operative signal 70 into a digital representation thereof. Such a circuit may preferably be an integral circuit type ICL 1706, manufactured by Intersil Corporation. The digital signals are coupled as a parallel output on leads 74 to a digital display 76 formed of a 4-digit liquid crystal display device.

In addition to providing such a display, the device is further adapted to provide an alarm when the detected sound pressure level exceeds the predetermined threshold established by the threshold reference level signal. Such a capability is provided by comparator 78, which compares the amplitude of the maximum level signal on lead 62 with the level of the reference signal produced by the network 68. When the comparator indicates that the detected maximum level signal exceeds that of the reference signal, an output from comparator 78 triggers alarm 80. To terminate the triggering of the alarm, when the first pole 46 of switch 24 is opened, so as to interrupt the further processing of detected sound pressure levels, and to thus establish a given amplitude of a maximum level signal provided on lead 62, the other pole 48 of switch 24 is closed, thereby disabling amplifier 78.

Figure 3:
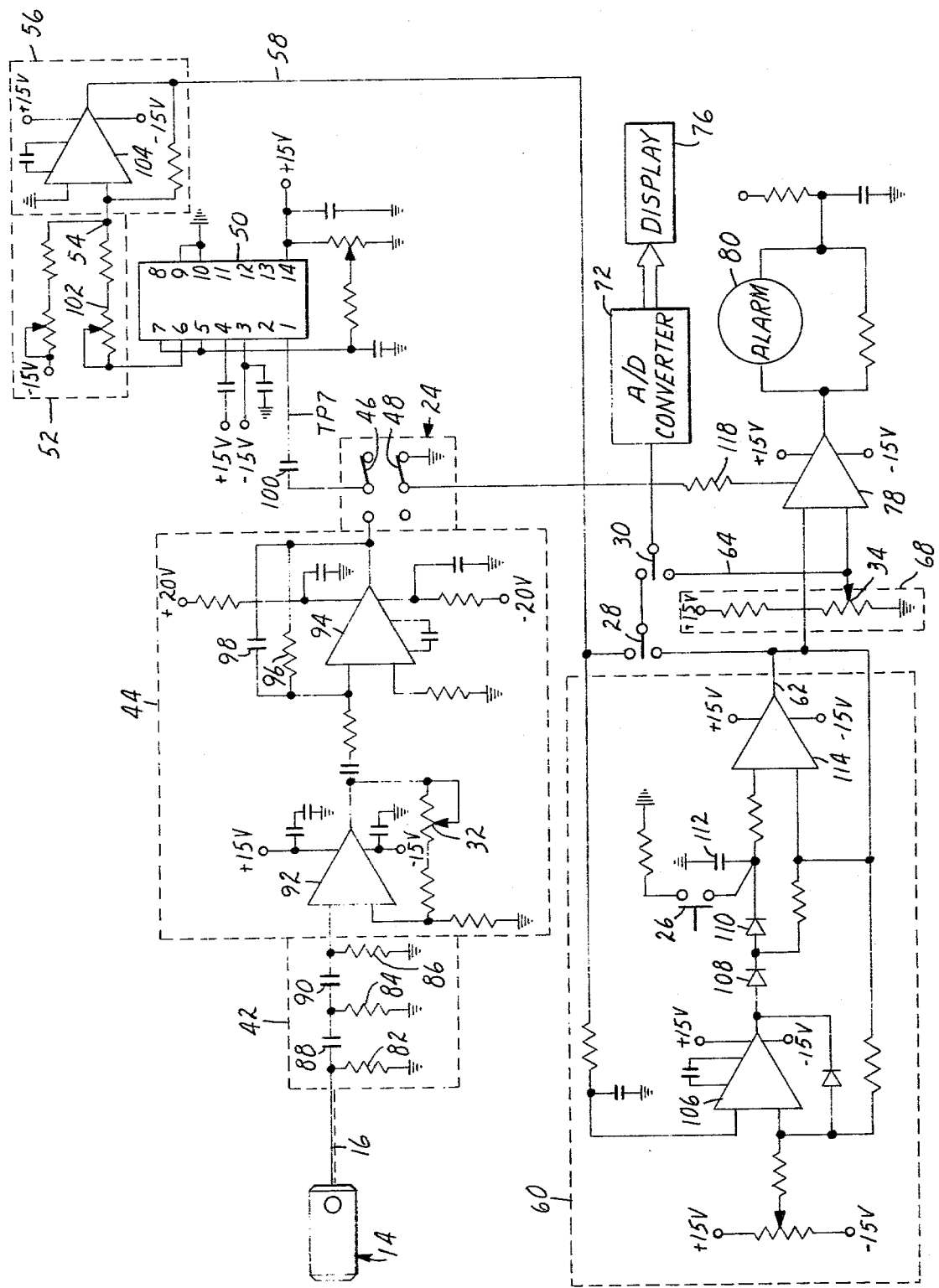
FIG. 3 is a detailed circuit diagram corresponding to a preferred embodiment similar to that shown in simplified form in FIG. 2.

A detailed circuit of a preferred embodiment similar to that shown in block diagram form in FIG. 2 is further set forth in FIG. 3. In that Figure, the transducer 14 is again shown to include a high impedance microphone 36 and a preamplifier buffer stage 38. Such a transducer 14 perferably comprises a microphone together with a built-in FET amplifier, such as type BL-1802, manufactured by Knowles Electronics, Inc., Franklin Park, Illinois, U.S.A. The electrical signal produced by amplifier 38 is coupled through shielded cable 16 to provide an electrical signal on lead 40 to the filter circuit 42. As shown in FIG. 3, such a circuit preferably includes a frequency weighting network comprising a pair of RC networks formed of resistors 84 and 86 and capacitors 88 and 90, respectively, to correspond to the "A" weighting specification set forth in ANSI standard 1.4—1971.

The thus weighted electrical signal is then coupled to the amplifier 44, which preferably comprises a pair of integrated circuit amplifiers, such as a type LF 356 operational amplifier 92 which receives the output from the filter circuit 42 and provides an output which is coupled to a second operational amplifier 94, such as type $\mu$ A 748, manufactured by National Semiconductor, Inc. Amplifier 92 further includes a variable resistance feedback loop adjustable through access 32 on the front panel shown in FIG. 1 for adjusting the overall sensitivity of the device. The output of amplifier 94 is fed back to its input through an RC network formed of resistor 96, and capacitor 98 to provide a high frequency roll-off correction. The remaining components within amplifier 44 are of a conventional nature.

The output of amplifier 94 is coupled to the lock-out swtich 24, which as described in FIG. 2, includes two poles, 46 and 48, respectively. When pole 46 is closed, the output of amplifier 94 is coupled through a coupling capacitor 100 to the input of the rms detector 50. Detector 50 is preferably an IC circuit such as type AD 536K detector, manufactured by Analog Devices, Inc. of Boston, Mass. Such a device may be coupled to provide either a linear or logarithmic output. In the embodiment of the present invention, a logarithmic output is selected from a terminal of the device and is coupled through an adjustable resistor network 102 to node 54. The signal provided by the circuit 50 is bipolar in nature, having linear excursions both positive and negative with respect to a reference potential (i.e. ground) which corresponds to the logarithm of the value of the root mean square value of the ambient sound level as received at the input to the device. In order to convert such a bipolar signal into a unipolar signal, a reference current provided by the reference current network 52 is summed together with the bipolar signal at node 54. The reference current is desirably adjusted to provide a shift in the current at the input of amplifier 56 such that the output therefrom is always positive. Particularly, the current is adjusted such that if a given sound pressure level results in a one volt rms input to the detector 50, thus yielding an 0-volt output therefrom, the output of the amplifier 56 will be calibrated to indicate that sound pressure level as a positive DC potential. The summation of the reference current and the output of the resistor network 102 at node 54, thus provides a unipolar signal, the absolute level of which corresponds to the logarithm of the rms value of detected ambient sound pressure levels. Network 102 is also adjustable to control the gain of amplifier 104 to further ensure proper calibration of the device.

The logarithmic output of the converter 50 is desirable in that it enables a combined dynamic range in excess of 70 db when audio frequency signals are applied. Accordingly, the device of the invention is particularly suitable for monitoring sound pressure levels varying over wide ranges without necessitating means for switching between scales of varying sensitivities.

The combined outputs at node 54 is coupled to amplifier 56, which preferably comprises an integrated circuit operational amplifier 104, such as type LM 301A. The output of that amplifier provides the logarithmic signal on lead 58 to both a contact on switch 28 and to the maximum hold circuit 60. As shown in FIG. 3, the maximum hold circuit 60 preferably includes a first amplifier such as operational amplifier 106, type LM 301A, the output of which is coupled through diodes 108 and 110 to a storage capacitor 112, preferably having a value of 10 microfarads. In operation, capacitor 112 becomes charged to whatever signal level is provided by amplifier 106, and retains such a charged state, representing the maximum signal level provided by amplifier 106, until discharged by the reset switch 26, such as a momentary contact push button. The potential on capacitor 112 is coupled to a second operational amplifier 114, such as type CA 3140B. The output of amplifier 114 thus provides the maximum hold signal on lead 62. This signal is coupled to a second contact of switch 28. By selective placement of switch 28, a sound level signal may be selected to be either the signal level as provided in lead 58, or the maximum hold signal as provided in lead 62. The output of switch 28 is coupled to one contact of switch 30, the other contact of which is connected via lead 64 to the threshold reference potential network 68. The reference potential network 68 comprises a conventional adjustable voltage divider network. The adjustment of that potential is facilitated by providing access 34 on the top panel of the housing 12.

The select switch 30 enables either the selected sound level signal or the reference potential to be coupled to the A/D converter 72 and thence to the display 76. The A/D converter is preferably an integrated circuit, type 1706, manufactured by Intersil Corp. connected in a conventional fashion. Similarly, the display 76 is desirably a 4 digit liquid crystal display such as type MLC 210-01 manufactured by Motorola, Corp. connected in a conventional manner.

The output of the maximum hold circuit 60, on lead 62, and the output of the threshold reference potential network on lead 64, as adjusted through access 34, are also coupled to a comparator 78, such as integrated circuit type LM 311. In the event the level of the maximum hold signal exceeds the predetermined threshold level, an output from comparator 78 is coupled to alarm 80, which in a preferred embodiment may be an audio speaker. In order to prevent the alarm sounding after the lock-out switch has been thrown so as to maintain a given signal level within the hold circuit 60, the comparator 78 is further coupled through resistor 118 to the second pole 48 of switch 24, so as to deactivate the comparator 78, thereby removing the trigger to the alarm 80.

In a preferred embodiment, the circuit shown in FIG. 3 is adapted to be battery powered so as to the particularly suited for mobile operations. In an alternative embodiment, the circuit may also be adapted for receiving power from a 110 volt AC source by means of conventional step-down transformers, and suitable DC power conversion and circuits. In any event, the circuit of FIG. 3 is designed to operate from positive and negative 15 Volt supplies of a highly regulated nature. Such supplies are of a conventional design and need not be further described.

Having thus described the present invention, what is claimed is:

1. In a device adapted to provide a digital display of sound pressure levels over an extended range of levels including
    (a) means for detecting ambient sound pressure levels occurring in real time and for converting said detected levels into an electrical signal indicative thereof;
    (b) means responsive to said electrical signal for providing a logarithmic signal; linear excursions of which correspond to a logarithm of the root mean square (rms) value of said real time ambient sound pressure level, said logarithmic signal providing means including
        (i) means for amplifying said electrical signal, and for providing a bipolar signal of which linear excursions, both positive and negative with respect to a reference potential correspond to the logarithm of the root mean square (rms) value of said ambient sound pressure level;
        (ii) means for establishing a predetermined negative current, and
        (iii) means for summing said bipolar signal and said predetermined negative current to provide a unipolar logarithmic signal, which corresponds to variations in ambient sound pressure levels;
    (c) means responsive to said logarithmic signal for generating and holding a maximum level signal corresponding to the logarithm of a maximum sound pressure level;
    (d) means for resetting said generating and holding means;
    (e) means for providing a reference signal representative of a predetermined threshold sound pressure level;
    (f) means for comparing said reference signal with said maximum level signal and for initiating an alarm when said maximum level signal exceeds said reference signal, thus indicating that the ambient sound pressure level exceeds said predetermined threshold sound pressure level;
    (g) means for switching between said logarithmic signal, said maximum level signal and said reference signal to provide as an operative signal one of the three signals;
    (h) means for converting said operative signal into a decimal equivalent thereof; and
    (i) means for displaying said decimal equivalent, whereby said display means is adapted to selectively and reversibly display a representation of either said ambient sound pressure level, said maximum sound pressure level, or said predetermined threshold sound pressure level without the display of one said level affecting or preventing the subsequent display of the other and the display of the representation of said predetermined threshold level enables ready awareness of said threshold level and convenient adjustment of said reference signal corresponding to a desired threshold level.

2. A device according to claim 1 wherein said amplifying means includes a solid state circuit including amplification and RMS converting means for providing a combined dynamic range in excess of 70 db when audio frequency sinusoidal input signals are applied thereto, whereby the device is capable of monitoring sound pressure levels varying over wide ranges without necessitating means for switching between scales of various sensitivities.

3. A device according to claim 1, wherein said alarm providing means includes means for providing an audio alarm when a received logarithmic signal level exceeds a predetermined sound pressure level.

4. A device according to claim 1, wherein said device further comprises means for weighting said electrical signal provided by said detecting means to provide a response to input sound pressure levels corresponding to a predetermined frequency response.

* * * * *